United States Patent [19]

Guenthner et al.

[11] Patent Number: 5,216,085
[45] Date of Patent: Jun. 1, 1993

[54] METHOD FOR CURING FLUOROELASTOMER COMPOSITIONS CONTAINING FLUOROALIPHATIC SULFONAMIDES AS CURING AGENTS

[75] Inventors: Richard A. Guenthner, Birchwood; Robert E. Kolb, St. Paul, both of Minn.

[73] Assignee: Minnesota Mining and Manufacturing Company, St. Paul, Minn.

[21] Appl. No.: 818,548

[22] Filed: Jan. 9, 1992

Related U.S. Application Data

[60] Division of Ser. No. 619,669, Nov. 28, 1990, Pat. No. 5,086,123, which is a continuation of Ser. No. 376,886, Jul. 6, 1989, abandoned, which is a continuation-in-part of Ser. No. 654,191, Sep. 24, 1984, abandoned, which is a continuation-in-part of Ser. No. 583,762, Feb. 27, 1984, abandoned.

[51] Int. Cl.$^5$ ................................................. C08F 8/34
[52] U.S. Cl. .................................................... 525/351
[58] Field of Search .......................................... 525/351

[56] References Cited

U.S. PATENT DOCUMENTS

| | | |
|---|---|---|
| 2,732,398 | 1/1956 | Brice et al. |
| 2,803,656 | 8/1957 | Albrecht et al. |
| 2,968,649 | 1/1961 | Pailthorp et al. |
| 3,051,677 | 8/1962 | Rexford. |
| 3,318,854 | 5/1967 | Honn et al. |
| 3,352,798 | 11/1967 | Breslow et al. |
| 3,632,788 | 1/1972 | Stivers et al. |
| 3,655,727 | 4/1972 | Patel et al. |
| 3,686,143 | 8/1972 | Bowman. |
| 3,712,877 | 1/1973 | Patel et al. |
| 3,857,807 | 12/1974 | Kometani et al. |
| 3,876,654 | 4/1975 | Pattison. |
| 3,895,062 | 7/1975 | Harrington et al. |
| 3,915,907 | 10/1975 | Hopper. |
| 3,933,732 | 1/1976 | Schmiegel. |
| 4,233,421 | 11/1980 | Worm ............................ 525/343 |
| 4,250,278 | 2/1981 | Suzuki et al. .................. 525/340 |
| 4,259,463 | 3/1981 | Moggi et al. |
| 4,287,320 | 9/1981 | Kolb ............................... 525/340 |
| 4,296,034 | 10/1981 | Bouvet et al. |
| 4,358,559 | 11/1982 | Holcomb et al. ............... 524/380 |

*Primary Examiner*—Christopher Henderson
*Attorney, Agent, or Firm*—Gary L. Griswold; Walter N. Kirn; David L. Weinstein

[57] ABSTRACT

Vulcanizable fluorocarbon elastomer compositions containing a vinylidene fluoride copolymer and a fluoroaliphatic sulfonamide curing agent. A second curing agent selected from organic polyhydroxy compounds or derivatives thereof, and an organo-onium accelerator are also employed. The compositions of this invention can be used to prepare shaped articles that exhibit high tensile strength accompanied by high elongation and a low value of compression set.

10 Claims, No Drawings

METHOD FOR CURING FLUOROELASTOMER COMPOSITIONS CONTAINING FLUOROALIPHATIC SULFONAMIDES AS CURING AGENTS

This application is a divisional of U.S. application Ser. No. 07/619,669, filed Nov. 28, 1990, now U.S. Pat No. 5,086,123, which is a continuation of U.S. Ser. No. 07/376,886, filed Jul. 6, 1989, now abandoned, which was a continuation-in-part of U.S. Ser. No. 654,191, filed Sep. 24, 1984, now abandoned which was a continuation-in-part of U.S. Ser. No. 583,762, filed Feb. 27, 1984, now abandoned.

This invention relates to a method for vulcanizing fluorocarbon elastomers and vulcanizing agents for use therein. In another aspect, the invention relates to vulcanizable fluorocarbon elastomer compositions containing vinylidene fluoride polymers and vulcanizing agent and adjuvants. In a further aspect, this invention relates to the use of fluoroaliphatic sulfonamide compounds along with polyhydroxide compounds or polyamine compounds in the vulcanization of vinylidene fluoride polymers.

Among the polymers which are difficult to vulcanize are fluorocarbon elastomers prepared by the polymerization of vinylidene fluoride with other terminally unsaturated monoolefins, such as hexafluoropropene, 1-hydropentafluoropropene, chlorotrifluoroethylene, tetrafluoroethylene, and fluorinated vinyl ethers, such as perfluoromethyl vinyl ether. The vulcanized or cured fluorocarbon elastomers have valuable properties, such as acid and base resistance, thermal stability, high tensile strength, low compression set, and good tear resistance. As such, the fluorocarbon elastomers have become polymers of choice for service as gaskets, seals, and O-rings in severe or harsh environments in the automotive, aircraft, and chemical industries.

Presently used conventional vulcanizing (or curing) agents for fluorocarbon elastomers include aromatic polyhydroxy compounds, such as polyphenols, which are usually used in combination with certain vulcanization accelerators, viz., organo-onium compounds, e.g., ammonium, phosphonium, and sulfonium compounds. As is known, an organo-onium compound is the conjugate acid of a Lewis base (e.g., phosphine, amine, ether, or sulfide) and can be formed by reacting said Lewis base with a suitable alkylating agent (e.g., an alkyl halide or acyl halide) resulting in the expansion of the valence of the electron donating atom of the Lewis base and a positive charge on the organo-onium compound. Many of the organo-onium compounds useful as vulcanization accelerators contain at least one heteroatom, i.e., a non-carbon atom such as N, P, S, O, bonded to organic or inorganic moieties. See, for example, U.S. Pat. Nos. 3,655,727 (Patel et al), 3,712,877 (Patel et al), 3,857,807 (Komatani), 3,686,143 (Bowman), 3,933,732 (Schmiegel), 3,876,654 (Pattison), 4,233,421 (Worm), 4,250,278 (Suzuki et al), 4,259,463 (Moggi et al), and 4,358,559 (Holcomb et al); and also see West, A. C. and Holcomb, A. G., "Fluorinated Elastomers", Kirk-Othmer: *Encyclopedia of Chemical Technology*, Vol. 8, 3rd Ed., John Wiley & Sons, Inc., pp. 500-515 (1979). In addition to the vulcanizing accelerators, divalent metal oxides or hydroxides (as inorganic acid acceptors), fillers, processing aids, and other adjuvants are also conventionally employed in the vulcanization of fluorocarbon elastomer compositions.

Although conventionally vulcanized fluorocarbon elastomers have many useful properties, as mentioned above, they generally do not have sufficiently high tensile strength combined with sufficiently high elongation for certain applications. Such applications where high tensile strength, high elongation fluorocarbon elastomers would be especially useful include blowout preventers for oil wells, accumulator bladders, and diaphragms. Although increasing the cross-link density of cured elastomers will increase the tensile strength thereof, such an approach often adversely affects the elongation of the elastomer. This invention relates to the achievement of high tensile strength accompanied by high elongation in cured fluorocarbon elastomers by using a novel vulcanizing, or curing agent which does not adversely affect the other desired properties of the cured fluorocarbon elastomer.

Briefly, in one aspect of this invention, fluorocarbon elastomers are vulcanized by using as a novel vulcanizing agent a composition comprising a fluoroaliphatic sulfonamide curing agent. These curing agents preferably have one or two sulfonamido groups.

Preferred classes of the fluoroaliphatic sulfonamide curing agents useful in the practice of this invention can be represented by the following general formula:

$$R_f(A)_z SO_2 NR(M_{1/x}) \qquad \text{I}$$

or $$R_f'[(A)_z SO_2 NR(M_{1/x})]_2 \qquad \text{II}$$

wherein
$R_f$ represents a monovalent fluoroaliphatic radical having, for example, from 1 to 20 carbon atoms, preferably 4 to 10 carbon atoms,
$R_f'$ represents a divalent fluoroaliphatic radical having, for example, from 1 to 20 carbon atoms, preferably from 2 to 10 carbon atoms,
A represents an organic linkage such as $-CR^1R^2-$, $-CR^1R^2CR^3R^4-$, and $-CR^1=CR^2-$, wherein $R^1, R^2, R^3$, and $R^4$ are selected from the group consisting of hydrogen atom, fluorine atom, chlorine atom, and lower alkyl group, having, for example, 1 to 2 carbon atoms,
z is zero or one,
R represents hydrogen atom or alkyl radical having, for example, from 1 to 20 carbon atoms, preferably 1 to 12 carbon atoms, and
M represents hydrogen atom or salt forming cation with valence x, which is 1, 2, or 3.

The monovalent fluoroaliphatic radical, $R_f$, is a fluorinated, stable, inert, non-polar, saturated moiety. It can be straight chain, branched chain, and, if sufficiently large, cyclic, or combinations thereof, such as alkyl cycloaliphatic radicals. Generally, $R_f$ will have 1 to 20 carbon atoms, preferably 4 to 10, and will contain 40 to 83 weight percent, preferably 50 to 78 weight percent fluorine. The preferred compounds are those in which the $R_f$ group is fully or substantially completely fluorinated, as in the case where $R_f$ is perfluoroalkyl, $C_nF_{2n+1}$, where n is 1 to 20.

The divalent fluoroaliphatic radical, $R_f'$, is a fluorinated, stable, inert, non-polar, saturated moiety. It can be straight chain, branched chain, and, if sufficiently large, cyclic, or combinations thereof, such as alkylcycloaliphatic diradicals. Generally, $R_f'$ will have 1 to 20 carbon atoms, preferably 2 to 10. The preferred compounds are those in which the $R_f$ group is fully or substantially completely fluorinated, as in the case where $R_f$ is perfluoroalkyl, $C_nF_{2n}$, where n is 1 to 20, or perfluorocycloalkyl, $C_nF_{2n-2}$, where n is 5 to 20.

With respect to either $R_f$ or $R_f'$, the skeletal chain or carbon atoms can be interrupted by divalent oxygen or trivalent nitrogen hetero atoms, each of which is bonded only to carbon atoms, but preferably where such hetero atoms are present, such skeletal chain does not contain more than one said hetero atom for every two carbon atoms. An occasional carbon-bonded hydrogen atom, or chlorine atom may be present; where present, however, they preferably are present not more than once for every two carbon atoms in the chain. Where $R_f$ or $R_f'$ is or contains a cyclic structure, such structure preferably has 5 or 6 ring member atoms, 1 or 2 of which can be said hetero atoms, i.e., oxygen and/or nitrogen. Examples of $R_f$ radicals are fluorinated alkyl, e.g., $C_6F_{13}$—, $C_8F_{17}$—, alkoxyalkyl, e.g., $C_3F_7OCF_2$—. Examples of $R_f'$ are fluorinated alkylene, e.g., —$C_4F_8$—, —$C_6F_{12}$—. Where $R_f$ is designated as a specific radical, e.g., $C_8F_{17}$—, it should be understood that this radical can represent an average structure of a mixture, e.g., $C_6F_{13}$— to $C_{10}F_{21}$—, which mixture can also include branched structures.

Where R is an alkyl radical, it can be unsubstituted or substituted. Useful substituents include, for example, carbonyl groups, e.g.,

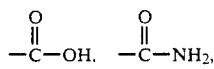

epoxy groups, e.g.,

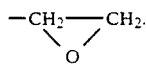

The fluorocarbon elastomers or gums, e.g., copolymers of vinylidene fluoride and hexafluoropropene, can be compounded with the fluoroaliphatic sulfonamide curing agent and the polyhydroxy or polyamine curing agent and the vulcanizing adjuvants commonly used in vulcanizing such elastomers, namely vulcanization accelerators, such as the aforementioned organoammonium, phosphonium, and sulfonium compounds, e.g., triphenylbenzylphosphonium chloride, divalent metal oxides or hydroxides (as acid acceptors), e.g., MgO and Ca(OH)$_2$, and reinforcing agents or fillers, e.g., carbon black and silica. The thus compounded elastomer or gumstock can then be shaped, e.g., by molding or extruding, in the form of seals, O-rings, gaskets, or other molded or extruded parts or goods, and heat applied to effect vulcanization (or curing or cross-linking), to produce a shaped elastomeric article with desirable tensile strength and elongation and other desirable properties, such as hardness, tear strength, and a low value of permanent deformation, i.e., compression set. Prior to the discovery of the composition of the present invention, it had been extremely difficult to efficiently prepare from a fluorocarbon elastomer gum a shaped elastomeric article having an acceptable value of elongation and a low value of compression set.

Fluoroaliphatic sulfonamides suitable as curing agents in the practice of this invention include known compounds [see, for example, U.S. Pat. No. 2,732,398 (Brice et al)]. They can be prepared by the reaction of ammonia or primary amines with perfluoroalkane sulfonyl fluorides (obtained by electrochemical fluorination of alkyl or alkylene sulfonyl halides), as shown by the following reaction scheme:

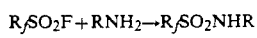

They can also be prepared following the procedures described in U.S. Pat. No. 4,296,034 (Bouvet et al), i.e.,

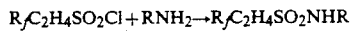

Salts of the sulfonamides can be prepared by reaction of the acidic sulfonamide compound with a suitable base, as described, for example, in U.S. Pat. No. 2,803,656 (Ahlbrecht et al):

Representative fluoroaliphatic sulfonamide compounds suitable for the practice of this invention include the following:

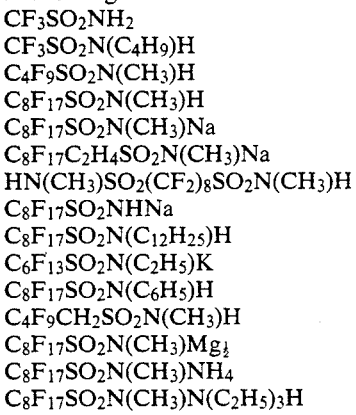

Curing agents that can be used in combination with the fluoroaliphatic sulfonamide curing agents of this invention for curing vinylidene fluoride copolymers include both the convention,al curing agents used to cure fluoroelastomers, i.e., polyhydroxy compounds or derivatives thereof, organic polyamines or derivatives thereof, and the recently developed curing agents such as fluoroaliphatic polyols and allyl ethers of aromatic polyhydroxy compounds. A second curing agent must be employed when the fluoroaliphatic sulfonamide is monofunctional, i.e., of the class of Formula I. Difunctional fluoroaliphatic sulfonamides, i.e., of the class of Formula II, can be used alone, that is, in the absence of a second curing agent. Representative examples of the above-mentioned second curing agents that can be used with monofunctional fluoroaliphatic sulfonamides include:

hydroquinone
resorcinol
4,4'-dihydroxydiphenylsulfone (Bisphenol S)
2,4'-dihydroxydiphenylsulfone
2,2-isopropylidine-bis (4-hydroxybenzene) (Bisphenol A)
2,2-hexafluoroisopropylidine-bis (4-hydroxybenzene) (Bisphenol AF)
4,4'-dihydroxybenzophenone
4,4'-biphenol
1-allyloxy-4-hydroxybenzene
Bisphenol A monoallyl ether
1,4-bis(hydroxymethyl) perfluorobutane
hexamethylenediamine carbamate N,N'-dicinnamylidine-1,6-hexanediamine Mixtures of the foregoing can also be used.

Organo-onium compounds suitable for use in this invention are known and are described in the art. Mixtures of organo-onium compounds are also useful in this invention. Classes of organo-onium compounds suitable for this invention include quaternary organo-onium compounds, such as those selected from the group consisting of ammonium, arsonium, phosphonium, stibonium, amino-phosphonium, phosphorane (e.g., triarylphosphorane), and iminium compounds, and sulfonium compounds.

Organo-onium compounds which can be used as accelerators in the compounded fluorocarbon elastomer compositions of this invention include the following representative compounds and mixtures thereof:
triphenylbenzyl phosphonium chloride
tributylallyl phosphonium chloride
tributylbenzyl ammonium chloride
tetrabutyl ammonium bromide
triphenyl sulfonium chloride
tritolyl sulfonium chloride
8-benzyl-1,8-diazabicyclo [5,4,0]-7-undecenium chloride
benzyl tris (dimethylamino) phosphonium chloride
benzyl(diethylamino)diphenylphosphonium chloride Organo-onium compounds that can be used as vulcanization accelerators in the compositions of this invention are more completely described in assignee's copending application Ser. No. 311,135, filed Feb. 15, 1989, incorporated herein by reference.

The polymers that are vulcanizable or curable according to this invention are known linear, saturated, thermoplastic, fluorinated polymers or gums which can be classified as fluorocarbon elastomers. Such polymers are described, for example, in the aforementioned prior art, e.g., U.S. Pat. Nos. 4,233,421 (Worm) and 4,287,320 (Kolb). Many of these are commercially available, sold under trademarks such as "Fluorel" and "Viton", and are copolymers of vinylidene fluoride and one or more other monoolefins (usually halogenated).

Among the polymers that can be vulcanized in accordance with this invention are the elastomeric copolymers of vinylidene fluoride with monomers selected from, for example, hexafluoropropene, chlorotrifluoroethylene, 2-chloropentafluoropropene, fluorinated alkyl vinyl ether, e.g., perfluoromethyl vinyl ether, tetrafluoroethylene, 1-hydropentafluoropropene, dichlorodifluoroethylene, trifluoroethylene, and 1,1-chlorofluoroethylene. These monoolefins can be copolymerized with each other in groups of two or more. They can also be copolymerized with other olefinic compounds such as ethylene or propylene. The preferred elastomers are copolymers of vinylidene fluoride with at least one terminally unsaturated fluoromonoolefin containing at least one fluorine atom substituent on each double-bonded carbon atom, each carbon atom of said fluoromonoolefin being substituted only with fluorine, chlorine, hydrogen, lower fluoroalkyl radical, or lower fluoroalkoxy radical, particularly hexafluoropropene, tetrafluoroethylene, chlorotrifluoroethylene, and 1-hydropentafluoropropene. Particularly preferred are the fluorocarbon elastomers produced by copolymerizing vinylidene fluoride with hexafluoropropene as described in U.S. Pat. Nos. 3,051,677 and 3,318,854 and those copolymers produced by copolymerizing vinylidene fluoride, hexafluoropropene, and tetrafluoroethylene as described in U.S. Pat. No. 2,968,649. The elastomeric copolymers of hexafluoropropene and vinylidene fluoride having between about 15 and about 50 mole percent hexafluoropropene, optionally with the addition of up to 30 mole percent tetrafluoroethylene, are illustrative of this preferred class. Mixtures or blends of fluorinated elastomers, e.g., of different viscosities, are also suitable.

When used as the sole curing agent, a sufficient amount of difunctional fluoroaliphatic sulfonamide curing agent must be used in order to bring about cross-linking of the fluorocarbon elastomer gum. In general, this amount is at least 0.001 mhr (moles per 100 grams fluorocarbon elastomer, gum, or rubber).

When monofunctignal fluoroaliphatic sulfonamide curing agent and a second curing agent are used in combination to cure the fluorocarbon elastomer, the total amount of both must be sufficient to bring about cross-linking of the fluorocarbon elastomer. This requirement is also applicable when difunctional fluoroaliphatic curing agent and a second curing agent are used in combination. A sufficient amount of fluoroaliphatic sulfonamide curing agent must be used with the second curing agent in order to provide sufficient cross-linking to provide improved properties, e.g., increased tensile strength, reduced compression set, when compared with the properties obtained in the absence of fluoroaliphatic sulfonamide curing agent. The amount of monofunctional fluoroaliphatic sulfonamide curing agent, e.g., $C_8F_{17}SO_2N(CH_3)H$, that can be used with the conventional curing agents, e.g., polyhydroxy compounds, in the curing of fluorocarbon elastomers in the present invention, ranges from about 0.0002 mhr to about 0.006 mhr. The amount of the conventional curing agent used in conjunction with the fluoroaliphatic sulfonamide will be about 0.0005 mhr to about 0.01 mhr. The total concentration of the curing agents must be at least 0.001 mhr. In general, increasing the concentration of the fluoroaliphatic sulfonamide curing agent and conventional curing agent, will result in a more highly cross-linked fluorocarbon elastomer.

Assignee's U.S. Pat. No. 3,632,788 discloses a composition comprising a copolymer of perfluoropropene and vinylidene fluoride or a terpolymer of perfluoropropene, vinylidene fluoride and tetrafluoroethylene and containing highly fluorinated fluid plasticizer in excess of the ordinary compatibility limit therein but in amounts less than about 280 parts by weight for each 100 parts of the elastomer, at least one compatibility extender comprising a low molecular weight, polar, fluoroaliphatic compound containing at least one polar group and containing at least 45% by weight of fluorine in the form of at least one fluoroaliphatic radical, said fluoroaliphatic compound having a melting point in the range of 50° C. to 200° C., said compatibility extender content being from about 0.5 to about 2 parts by weight per each part by weight of said plasticizer excess.

The composition of that patent uses a diamine as a curing agent and a fluoroaliphatic sulfonamide as a compatibility extender. The use of a diamine as a curing agent results in the cured fluorocarbon gum having a value of compression set that is unacceptable for such products as O-rings for high pressure applications (see *Encyclopedia of Polymer Science and Engineering*, Vol. 7, John Wiley & Sons (1987), pp. 262-267). The use of the curing system of the present invention, i.e., polyhydroxy compound, organo-onium accelerator, and fluoroaliphatic sulfonamide, provides cured fluorocarbon elastomer gums having both an acceptable value of compression set and an acceptable value of elongation.

The fluoroaliphatic sulfonamide curing agents of this invention, other curing agents, accelerators, acid acceptors, reinforcing agents, fillers, and other adjuvants such as processing aids, softeners, plasticizers, etc. can be incorporated into the fluorocarbon elastomer gum in the conventional manner.

Objects and advantages of this invention are illustrated in the examples described hereinafter. In those examples, curing conditions and properties of cured compounded gumstock were measured using the following procedures and test methods:

Curing Characteristics

ASTM D-2048-82 was run on uncured compounded gumstock using the Oscillating Disc Rheometer (ODR) Model 100S (Monsanto Company), an oscillating frequency of 100 cpm and a 3° arc. Minimum torque ($M_L$) and the torque attained at a stated time ($M_H$) were determined. Also determined were time in minutes for torque to increase 0.1N·m(1 lbf·in), $t_{s1}$, or time for torque to reach 5.6 N·m (50 lbf·in), $t_{5.6}$, respectively.

Press Cure

Elastomer sheets 150 mm×150 mm×1.8 mm were prepared for determination of physical properties by pressing uncured compounded gumstock at about $6.9 \times 10^3$ kPa for the indicated time at 177° C.

Post Cure

Samples were removed from the press and placed in a circulating air oven. The oven was maintained at the indicated temperature for the indicated time. The samples were then removed, cooled to room temperature, and physical properties determined.

Accelerated Aging

Post cured samples were placed in a circulating air oven for the indicated time at 275° C. The samples were then removed for measurement of physical properties according to ASTM D 573-81.

Tensile Strength at Break, Elongation at Break, Modulus at 100% Elongation

Samples cut from a 1.8 mm thick cured elastomer sheet were tested according to ASTM D-412-80 using the TENSOMETER, Model 500 (Monsanto Company) with a die having the following dimensions: A=3.5 mm, L=19 mm, C=51 mm.

Hardness, Shore A

Hardness was measured at room temperature on cured samples according to ASTM D-2240-81 using Shore Instrument and Mfg. Co.'s "A-2" device.

Compression Set

Tests according to ASTM D-395-78, Method B, were run on O-rings after the indicated press and post cures and the indicated temperature and time under compression. Results are reported as percent (%) change in dimension from original.

The fluoroaliphatic sulfonamides employed in the following examples were prepared from the corresponding sulfonyl fluoride compounds by reaction with ammonia or an alkyl amine. A subsequent reaction with alkali metal methoxides yielded the salt. Preparation of the fluoroaliphatic sulfonamides and their salts followed the general procedure described in Example 1 of U.S. Pat. No. 2,803,656 (Ahlbrecht et al). The magnesium salt was prepared in a similar manner by reaction of magnesium methoxide with the fluoroaliphatic sulfonamide. The ammonium and triethylammonium salts were prepared by reacting the fluoroaliphatic sulfonamide with excess liquid ammonia and excess triethylamine, respectively.

In all of the following examples, the terms "parts" and "phr" represent weight in grams and grams per hundred parts gum, elastomer, or rubber, respectively, and "mhr" represents moles per 100 parts gum, elastomer, or rubber.

Curing agents not of the fluoroaliphatic sulfonamide class and cure accelerators employed in the following examples are listed in Tables I and II, respectively.

TABLE I

| | Curing agents | |
|---|---|---|
| No. | Designation | Chemical identity |
| 1 | Bisphenol AF | 4,4'-$HOC_6H_4C(CF_3)_2C_6H_4OH$ |
| 2 | Bisphenol S | 4,4'-$HOC_6H_4SO_2C_6H_4OH$ |
| 3 | Biphenol C | 4,4'-$HOC_6H_4COC_6H_4OH$ |
| 4 | HQ | 1,4-$HOC_6H_4OH$ |
| 5 | Biphenol | 4,4'-$HOC_6H_4$—$C_6H_4OH$ |
| 6 | Bisphenol A-AE (mixture of components a:b:c in 1.1:1.6:1 weight ratio) | a. $HOC_6H_4C(CH_3)_2C_6H_4OH$<br>b. $HOC_6H_4C(CH_3)_2C_6H_4OCH_2CH=CH_2$<br>c. $CH_2=CHCH_2OC_6H_4C(CH_3)_2$—$C_6H_4OCH_2CH=CH_2$ |
| 7 | FC-diol | $HOCH_2(CF_2)_4CH_2OH$ |

TABLE II

| | Cure accelerators | |
|---|---|---|
| No. | Designation | Chemical identity |
| 1 | TPBPC | $(C_6H_5)_3P(CH_2C_6H_5)^+Cl^-$ |
| 2 | TBBAC | $(C_4H_9)_3N(CH_2C_6H_5)^+Cl^-$ |
| 3 | TTSC | $[(CH_3)C_6H_4]_3S^+Cl^-$ |

EXAMPLE 1

A vinylidene fluoride copolymer gum (FKM C) was compounded on a two-roll rubber mill with a low level of a conventional vulcanizing agent and a normal level of adjuvants. FKM C contains 80 mole percent $CF_2=CH_2$ and 20 mole percent $CF_3CF=CF_2$. In one of the runs, a fluoroaliphatic sulfonamide curing agent of this invention was incorporated into the formulation. A control run, i.e., a formulation without a fluoroaliphatic sulfonamide curing agent, was also run for the purpose of comparison. The milled, compounded gumstocks were evaluated for curing characteristics, and properties of the cured gumstocks were measured after press cure, post cure, and aging.

Curable gumstock compositions, curing characteristics, and properties of cured gumstocks are shown in Table III.

TABLE III

| | Run no. | |
|---|---|---|
| | 1 | 2 |
| Curable gumstock ingredients | | |
| FKM C, high viscosity gum, part | 100 | 100 |
| Carbon black (N-110), phr | 25 | 25 |
| Ca(OH)$_2$, phr | 6 | 6 |
| TPBPC, mhr × 10$^3$ | 1.4 | 0.77 |
| Bisphenol AF, mhr × 10$^3$ | 0.625 | 0.625 |
| $C_8F_{17}SO_2N(CH_3)Na$, mhr × 10$^3$ | 0 | 2.81 |
| Curing characteristics | | |
| ODR, 177° C.: | | |

TABLE III-continued

| | Run no. | |
|---|---|---|
| | 1 | 2 |
| $M_L$, N·m | 4.86 | 5.20 |
| $M_H$, N·m, 12 minutes | 5.54 | 5.99 |
| $t_{sl}$, minutes | 3 | 2.1 |
| $t_{5.6}$, minutes | 8 | 5.0 |
| Properties of cured gumstock | | |
| Press cure properties (2.5 hrs/177° C.) | | |
| Tensile strength, MPa | 7.51 | 20.04 |
| Elongation at break, % | 718 | 550 |
| Modulus, 300%, MPa | 4.79 | 9.51 |
| Post cure properties (20 hrs/177° C.) | | |
| Tensile strength, MPa | 10.42 | 21.63 |
| Elongation at break, % | 550 | 411 |
| Modulus, 300%, MPa | 7.31 | 15.24 |
| Hardness, Shore A | 78 | 76 |
| Tear resistance, kN/m | 26 | 28 |
| (ASTM D 624-81, Die C, 25° C.) | | |

Faster cure rates, considerably higher tensile strengths and modulus, and improved tear resistance were obtained in Run 2. Relatively high elongations were maintained in Run 2 even at the high tensile strengths achieved.

EXAMPLE 2

A vinylidene fluoride copolymer gum (FKM C) was compounded in several different runs on a two-roll rubber mill with a conventional vulcanizing agent and adjuvants. In nine of the runs, a fluoroaliphatic sulfonamide curing agent suitable for use in this invention was incorporated into the formulation. The fluoroaliphatic sulfonamide curing agents were all in the form of a salt, except for Run 12. The amounts of the various ingredients are shown in Table IV.

TABLE IV

| Curable gumstock ingredients | |
|---|---|
| FKM C, parts | 100 |
| Carbon black (N-990), phr | 30 |
| MgO, phr | 3 |
| Ca(OH)$_2$, phr | 6 |
| TPBPC, mhr × 10$^3$ | 1.22 |
| Bisphenol AF, mhr × 10$^3$ | 2.23 |
| Fluoroaliphatic sulfonamide curing agent, mhr × 10$^3$ | 1.22 |

The fluoroaliphatic sulfonamide curing agent for each run is listed below:

| Run no. | Curing agent |
|---|---|
| 3 | Control |
| 4 | $C_8F_{17}SO_2N(CH_3)Na$ |
| 5 | $C_4F_9SO_2N(CH_3)Na$ |
| 6 | $C_8F_{17}SO_2N(C_4H_9)Na$ |
| 7 | $H(CH_3)NSO_2(CF_2)_8SO_2N(CH_3)Na$ |
| 8 | $C_8F_{17}C_2H_4SO_2N(CH_3)Na$ |
| 9 | $C_8F_{17}SO_2N(H)Na$ |
| 10 | $C_8F_{17}SO_2N(CH_3)(Mg)_{\frac{1}{2}}$ |
| 11 | $C_8F_{17}SO_2N(CH_3)NH_4$ |
| 12 | $C_8F_{17}SO_2N(CH_3)N(C_2H_5)_3H$ |

The milled, compounded gumstocks were evaluated for curing characteristics, and properties of the cured gumstocks were measured after press cure, post cure, and aging. Compression set was also determined. A control run (Run 3), i.e., a formulation without a fluoroaliphatic sulfonamide curing agent, was also run for the purpose of comparison.

Curing characteristics of the uncured gumstock compositions, and properties of cured gumstocks, are shown in Table V.

TABLE V

| | Run no. | | | | | | | | | |
|---|---|---|---|---|---|---|---|---|---|---|
| | 3 | 4 | 5 | 6 | 7 | 8 | 9 | 10 | 11 | 12 |
| Curing characteristics | | | | | | | | | | |
| ODR, 177° C.: | | | | | | | | | | |
| $M_L$, N·m | 1.92 | 1.92 | 2.03 | 2.03 | 1.69 | 1.92 | 1.36 | 1.92 | 1.81 | 1.69 |
| $M_H$, N·m (12 minutes) | 3.62 | 6.33 | 6.21 | 5.65 | 7.91 | 4.75 | 3.95 | 6.33 | 6.55 | 5.88 |
| $t_{sl}$, minutes | 2.0 | 1.3 | 1.3 | 1.5 | 2.0 | 1.8 | 3.1 | 1.8 | 1.7 | 1.7 |
| $t_{5.6}$, minutes | — | 2.6 | 2.6 | 7.0 | 3.4 | — | — | 3.6 | 3.2 | 3.4 |
| Properties of cured gumstock | | | | | | | | | | |
| Press cure properties (10 min./177° C.): | | | | | | | | | | |
| Tensile strength, MPa | 7.37 | 9.29 | 9.60 | 9.53 | 9.86 | 9.02 | 8.71 | 9.79 | 9.12 | 9.94 |
| Elongation at break, % | 730 | 427 | 409 | 456 | 374 | 536 | 646 | 464 | 376 | 446 |
| Modulus, 100%, MPa | 1.91 | 2.46 | 2.45 | 2.34 | 3.23 | 2.16 | 1.92 | 2.36 | 2.52 | 2.26 |
| Hardness, Shore A | 66 | 67 | 67 | 67 | 68 | 67 | 66 | 67 | 66 | 66 |
| Postcure properties (20 hrs/260° C.): | | | | | | | | | | |
| Tensile strength, MPa | 8.15 | 12.66 | 13.29 | 12.07 | 12.51 | 10.92 | 11.80 | 13.47 | 10.62 | 12.18 |
| Elongation at break, % | 517 | 283 | 297 | 270 | 242 | 386 | 337 | 312 | 247 | 274 |
| Modulus, 100%, MPa | 2.02 | 2.96 | 2.88 | 2.93 | 3.57 | 2.60 | 2.43 | 2.79 | 2.03 | 2.69 |
| Hardness Shore A | 68 | 68 | 67 | 67 | 69 | 67 | 67 | 68 | 67 | 67 |
| Aging Properties (70 hrs/275° C.): | | | | | | | | | | |
| Tensile strength, MPa | 3.81 | 6.03 | 6.90 | 7.31 | 7.18 | 4.97 | 6.79 | 7.61 | 7.69 | 8.42 |
| Elongation at break, % | 640 | 326 | 327 | 287 | 248 | 500 | 393 | 311 | 285 | 265 |
| Modulus, 100%, MPa | 1.60 | 2.23 | 2.36 | 2.68 | 3.05 | 1.99 | 2.05 | 2.78 | 3.03 | 3.16 |
| Hardness, Shore A | 70 | 70 | 68 | 71 | 72 | 69 | 71 | 71 | 70 | 70 |
| Compression set (70 hrs/200° C.), % | 52.8 | 28.2 | 27.5 | 35.5 | 30.6 | 42.6 | 33.0 | — | — | — |

In control Run 3, wherein no fluoroaliphatic sulfonamide was present, torque obtained after 12 minutes in the ODR test was lower than that in runs wherein fluoroaliphatic sulfonamide was present. In addition, lower tensile strength and modulus were observed for press cured, post cured and aged fluorocarbon elastomer in Run 3 than for fluorocarbon elastomers in runs utilizing fluoroaliphatic sulfonamide. Moreover, very high elongation and a high compression set indicated a low state of cure for the fluorocarbon elastomer in Run 3.

EXAMPLE 3

Following the procedure of Example 2, four compounded curable fluorocarbon elastomer gumstocks were prepared. In Runs 14-17, the gumstock contained a fluoroaliphatic sulfonamide curing agent suitable for use in this invention in the free non-salt form. The identities and quantities of the various ingredients are shown in Table VI.

TABLE VI

| Curable gumstock ingredients | Parts |
|---|---|
| FKM C, parts | 100 |
| Carbon black (N-990), phr | 30 |
| MgO, phr | 3 |
| Ca(OH)$_2$, phr | 6 |
| TPBPC, mhr × 10$^3$ | 1.22 |
| Bisphenol AF, mhr × 10$^3$ | 2.23 |
| Fluoroaliphatic sulfonamide curing agent, mhr × 10$^3$ | 1.22 |

The fluoroaliphatic sulfonamide curing agent for each run is listed below:

| Run no. | Curing agent |
|---|---|
| 13 | Control |
| 14 | $C_8F_{17}SO_2N(CH_3)H$ |
| 15 | $C_4F_9SO_2N(CH_3)H$ |
| 16 | $C_8F_{17}SO_2N(C_{12}H_{25})H$ |
| 17 | $C_8F_{17}C_2H_4SO_2N(CH_3)H$ |

Curing characteristics of the uncured gumstocks, and properties of the cured gumstocks were determined and are shown in Table VII.

TABLE VII

|  | Run no. | | | | |
|---|---|---|---|---|---|
|  | 13 | 14 | 15 | 16 | 17 |
| Curing characteristics | | | | | |
| ODR, 177° C.: | | | | | |
| $M_L$, N·m | 1.92 | 2.05 | 1.86 | 1.82 | 1.81 |
| $M_H$, N·m | 3.62 | 6.44 | 6.33 | 5.76 | 3.84 |
| $t_{s/}$, minutes | 2.0 | 1.5 | 1.6 | 1.8 | 1.5 |
| $t_{5,6}$, minutes | — | 2.9 | 3.1 | 6.0 | — |
| Properties of cured gumstock | | | | | |
| Press cure properties (10 min/177° C.): | | | | | |
| Tensile strength, MPa | 7.37 | 9.47 | 9.68 | 9.35 | 7.97 |
| Elongation at break, % | 730 | 373 | 424 | 459 | 649 |
| Modulus, 100%, MPa | 1.91 | 2.49 | 2.46 | 2.27 | 2.02 |
| Hardness, Shore A | 66 | 67 | 67 | 67 | 66 |
| Post cure properties (20 hrs/260° C.): | | | | | |
| Tensile strength, MPa | 8.15 | 11.55 | 12.97 | 12.35 | 8.78 |
| Elongation at break, % | 517 | 267 | 281 | 291 | 445 |
| Modulus, 100%, MPa | 2.02 | 2.88 | 2.89 | 2.73 | 2.50 |
| Hardness, Shore A | 68 | 67 | 67 | 67 | 68 |
| Aging properties (70 hrs/275° C.): | | | | | |
| Tensile strength, MPa | 3.81 | 7.37 | 7.18 | 7.13 | — |
| Elongation at break, % | 640 | 331 | 326 | 268 | — |
| Modulus, 100%, MPa | 1.60 | 2.43 | 2.25 | 2.63 | — |
| Hardness, Shore A | 70 | 68 | 70 | 71 | — |
| Compression set (70 hrs/200° C.) | 52.8 | 30.2 | 26.3 | 38.6 | — |

Generally higher tensile strength and modulus were observed for the cured gumstocks containing fluoroaliphatic sulfonamide curing agent (see Runs 14-17).

EXAMPLE 4

Following the procedure of Example 2, fourteen compounded curable fluorocarbon elastomer gumstocks were prepared containing various conventional organic dihydroxy curing agents. In one-half of the runs, the gumstocks contained a fluoroaliphatic sulfonamide curing agent suitable for use in this invention. The other runs were comparative runs. The identities and amounts of the various ingredients are shown in Table VIII.

TABLE VIII

|  | Run no. | | | | | | | | | | | | | |
|---|---|---|---|---|---|---|---|---|---|---|---|---|---|---|
|  | 18 | 19 | 20 | 21 | 22 | 23 | 24 | 25 | 26 | 27 | 28 | 29 | 30 | 31 |
| Curable gumstock ingredients | | | | | | | | | | | | | | |
| FRM C, parts | 100 | 100 | 100 | 100 | 100 | 100 | 100 | 100 | 100 | 100 | 100 | 100 | 100 | 100 |
| Carbon black (N-990), phr | 30 | 30 | 30 | 30 | 30 | 30 | 30 | 30 | 30 | 30 | 30 | 30 | 30 | 30 |
| MgO, phr | 3 | 3 | 3 | 3 | 3 | 3 | 3 | 3 | 3 | 3 | 3 | 3 | 3 | 3 |
| Ca(OH)$_2$, phr | 6 | 6 | 6 | 6 | 6 | 6 | 6 | 6 | 6 | 6 | 6 | 6 | 6 | 6 |
| TPBPC, mhr × 10$^3$ | 1.22 | 1.22 | 1.22 | 1.22 | 1.22 | 1.22 | 1.22 | 1.22 | 1.22 | 1.22 | 1.22 | 1.22 | 1.22 | 1.22 |
| Fluoroaliphatic sulfonamide curing agent | | | | | | | | | | | | | | |
| $C_8F_{17}SO_2N(CH_3)H$, mhr × 10$^3$ | — | 1.22 | — | 1.22 | — | 1.22 | — | 1.22 | — | 1.22 | — | 1.22 | — | 1.22 |
| Dihydroxy curing agents$^a$ | | | | | | | | | | | | | | |
| Bisphenol AF, mhr × 10$^3$ | 6.50 | 6.50 | — | — | — | — | — | — | — | — | — | — | — | — |
| Bisphenol S, mhr × 10$^3$ | — | — | 6.50 | 6.50 | — | — | — | — | — | — | — | — | — | — |
| Bisphenol C, mhr × 10$^3$ | — | — | — | — | 6.50 | 6.50 | — | — | — | — | — | — | — | — |
| Bisphenol, mhr × 10$^3$ | — | — | — | — | — | — | 6.50 | 6.50 | — | — | — | — | — | — |
| HQ, mhr × 10$^3$ | — | — | — | — | — | — | — | — | 6.50 | 6.50 | — | — | — | — |
| Bisphenol A-AE mixture, mhr × 10$^3$ | — | — | — | — | — | — | — | — | — | — | 3.80 | 3.80 | — | — |
| FC-diol, mhr × 10$^3$ | — | — | — | — | — | — | — | — | — | — | — | — | 6.50 | 6.50 |

$^a$Structures of co-curing agents are shown in Table I.

Curing characteristics of the uncured gumstocks, and properties of the cured gumstocks were determined, and are shown in Table IX.

TABLE IX

Run no.

TABLE IX-continued

|  | 18 | 19 | 20 | 21 | 22 | 23 | 24 |
|---|---|---|---|---|---|---|---|
| Curing Characteristics | | | | | | | |
| ODR, 177° C.: | | | | | | | |
| $M_L$, N · m | 1.02 | 0.68 | 1.24 | 0.68 | 1.47 | 0.79 | 1.47 |
| $M_H$, N · m; 12 minutes | 10.96 | 10.39 | 2.37 | 5.65 | 5.76 | 7.34 | 6.78 |
| $t_{sh}$, minutes | 6.0 | 5.0 | 7.2 | 6.0 | 4.8 | 4.8 | 3.0 |
| $t_{5.6}$, minutes | 8.7 | 7.0 | — | 11.9 | 11.6 | 7.6 | 13 |
| Properties of cured gumstock | | | | | | | |
| Press cure properties (10 min/177° C.): | | | | | | | |
| Tensile strength, MPa | 9.45 | 10.91 | 8.93 | 10.70 | 8.94 | 11.02 | 7.96 |
| Elongation at break, % | 235 | 229 | 401 | 320 | 318 | 274 | 259 |
| Modulus, 100%, MPa | 4.32 | 4.58 | 2.72 | 3.16 | 2.96 | 3.44 | 3.36 |
| Hardness, Shore A | 74 | 72 | 70 | — | 70 | 72 | 68 |
| Postcure properties (20 hrs/260° C.): | | | | | | | |
| Tensile strength, MPa | 14.84 | 15.18 | 12.07 | 15.28 | 12.31 | 13.17 | 9.31 |
| Elongation at break, % | 172 | 158 | 288 | 218 | 248 | 191 | 177 |
| Modulus, 100%, MPa | 6.83 | 6.89 | 3.31 | 4.46 | 3.67 | 4.58 | 4.41 |
| Hardness, Shore A | 76 | 74 | 72 | 73 | 71 | 72 | 69 |
| Aging properties (70 hrs/275° C.): | | | | | | | |
| Tensile strength, MPa | 9.47 | 9.89 | 8.38 | 10.40 | 7.79 | 9.45 | 5.39 |
| Elongation at break, % | 206 | 157 | 382 | 265 | 346 | 224 | 266 |
| Modulus, 100%, MPa | 4.27 | 5.49 | 2.47 | 3.21 | 2.49 | 3.43 | 2.61 |
| Hardness, Shore A | 76 | — | 72 | 74 | 72 | 73 | 73 |
| Compression set (70 hrs/200° C.), % | 14.7 | 19.3 | 23.3 | 18.8 | 21.1 | 20.1 | 25.4 |

|  | Run no. | | | | | | |
|---|---|---|---|---|---|---|---|
|  | 25 | 26 | 27 | 28 | 29 | 30 | 31 |
| Curing Characteristics | | | | | | | |
| ODR, 177° C.: | | | | | | | |
| $M_L$, N · m | 0.68 | 1.47 | 1.24 | 1.81 | 1.69 | 2.37 | 1.92 |
| $M_H$, N · m; 12 minutes | 9.72 | 7.00 | 8.81 | 2.26 | 3.73 | 4.29 | 9.38 |
| $t_{sh}$, minutes | 5.0 | 2.7 | 2.3 | 2.3 | 1.8 | 1.4 | 1.4 |
| $t_{5.6}$, minutes | 8 | 4.5 | 3.6 | — | — | — | 9.38 |
| Properties of cured gumstock | | | | | | | |
| Press cure properties (10 min/177° C.): | | | | | | | |
| Tensile strength, MPa | 10.42 | 8.96 | 10.51 | —[a] | 10.34 | 5.56 | 10.30 |
| Elongation at break, % | 214 | 299 | 258 | — | 594 | 526 | 269 |
| Modulus, 100% MPa | 4.23 | 3.06 | 3.58 | — | 1.92 | 2.16 | 3.50 |
| Hardness, Shore A | 69 | 67 | 67 | — | 64 | 66 | 69 |
| Postcure properties (20 hrs/260° C.): | | | | | | | |
| Tensile strength, MPa | 15.18 | 13.24 | 14.22 | — | 12.53 | 9.71 | 15.26 |
| Elongation at break, % | 171 | 242 | 187 | — | 236 | 396 | 188 |
| Modulus, 100%, MPa | 5.81 | 3.67 | 4.51 | — | 3.41 | 2.72 | 5.34 |
| Hardness, Shore A | 70 | 67 | 67 | — | 68 | 68 | 70 |
| Aging properties (70 hrs/275° C.): | | | | | | | |
| Tensile strength, MPa | 8.63 | 6.55 | 9.13 | — | 7.67 | — | 10.96 |
| Elongation at break, % | 159 | 348 | 216 | — | 207 | — | 198 |
| Modulus, 100%, MPa | 4.85 | 2.19 | 3.54 | — | 3.45 | — | 3.67 |
| Hardness, Shore A | 68 | 67 | 69 | — | 66 | — | — |
| Compression set (70 hrs./200° C.), % | 24.0 | 22.4 | 25.5 | — | 35.9 | — | 18.3 |

[a]poor cured properties

In general, faster cure rates (as indicated by the value of $t_{5.6}$ and the higher torque after 12 minutes in the ODR test), and higher tensile strengths of cured elastomers were obtained for elastomer gumstocks containing fluoroaliphatic sulfonamide curing agents.

EXAMPLE 5

Following the procedure of Example 2, six compounded curable fluorocarbon elastomer gumstocks were prepared containing various conventional organo-onium cure accelerators. In one-half of the runs (33, 35, and 37), the gumstock contained a fluoroaliphatic sulfonamide curing agent suitable for use in this invention. The other runs (32, 34, and 36) were comparative runs. The identities and amounts of the various ingredients are shown in Table X.

TABLE X

|  | Run no. | | | | | |
|---|---|---|---|---|---|---|
|  | 32 | 33 | 34 | 35 | 36 | 37 |
| Curable gumstock ingredients | | | | | | |
| FKM C, parts | 100 | 100 | 100 | 100 | 100 | 100 |
| Carbon black (N-990), phr | 30 | 30 | 30 | 30 | 30 | 30 |
| MgO, phr | 3 | 3 | 3 | 3 | 3 | 3 |
| Ca(OH)$_2$, phr | 6 | 6 | 6 | 6 | 6 | 6 |
| Bisphenol AF, mhr × 10$^3$ | 2.23 | 2.23 | 2.23 | 2.23 | 2.23 | 2.23 |
| C$_8$F$_{17}$SO$_2$N(CH$_3$)Na, mhr × 10$^3$ | — | 1.22 | — | 1.22 | — | 1.22 |
| Cure accelerators[a] | | | | | | |
| TPBPC, mhr × 10$^3$ | 1.22 | 1.22 | — | — | — | — |
| TBBAC, mhr × 10$^3$ | — | — | 1.22 | 1.22 | — | — |

TABLE X-continued

|  | Run no. | | | | | |
|---|---|---|---|---|---|---|
|  | 32 | 33 | 34 | 35 | 36 | 37 |
| TTSC, mhr × 10³ | — | — | — | — | 1.22 | 1.22 |

*See Table II for structures of cure accelerators.

Curing characteristics of the uncured gumstocks, and properties of the cured gumstocks were determined, and are shown in Table XI.

TABLE XI

|  | Run no. | | | | | |
|---|---|---|---|---|---|---|
|  | 32 | 33 | 34 | 35 | 36 | 37 |
| Curing characteristics | | | | | | |
| ODR, 177° C.: | | | | | | |
| $M_L$, N · m | 1.92 | 1.92 | 1.58 | 1.64 | 1.41 | 1.58 |
| $M_H$, N · m; 12 minutes | 3.62 | 6.33 | 2.82 | 5.65 | 2.60 | — |
| $t_{sh}$, minutes | 2.0 | 1.3 | 2.1 | 1.9 | 3.3 | 2.9 |
| $t_{5.6}$, minutes | — | 2.6 | — | 5.0 | — | — |
| Properties of cured gumstock | | | | | | |
| Press cure properties (10 min/177° C.): | | | | | | |
| Tensile strength, MPa | 7.37 | 6.33 | 7.65 | 9.84 | 4.20 | 9.23 |
| Elongation at break, % | 730 | 427 | 673 | 415 | 765 | 529 |
| Modulus, 100%, MPa | 1.91 | 2.46 | 2.03 | 2.65 | 1.63 | 2.16 |
| Hardness, Shore A | 66 | 67 | 67 | 68 | 65 | 66 |
| Postcure properties (20 hrs/260° C.): | | | | | | |
| Tensile strength, MPa | 8.15 | 12.66 | 8.80 | 12.45 | 4.95 | 11.87 |
| Elongation at break, % | 517 | 283 | 500 | 268 | 680 | 403 |
| Modulus, 100%, MPa | 2.02 | 2.96 | 2.26 | 3.11 | 1.81 | 2.34 |
| Hardness, Shore A | 68 | 68 | 67 | 67 | 67 | 67 |
| Aging properties (70 hrs/275° C.): | | | | | | |
| Tensile strength, MPa | 3.81 | 6.93 | 4.02 | 6.92 | — | — |
| Elongation at break, % | 640 | 326 | 521 | 280 | — | — |
| Modulus, 100%, MPa | 1.60 | 2.23 | 1.64 | 2.69 | — | — |
| Hardness, Shore A | 70 | 70 | 68 | 71 | — | — |
| Compression set (70 hrs/200° C.), % | 52.8 | 28.2 | 66.8 | 36.1 | — | — |

In general, faster cure rates, higher tensile strengths, and lower compression sets of cured elastomers were obtained for elastomer gumstocks containing fluoroaliphatic sulfonamide curing agents.

EXAMPLE 6

Following the general procedure of Example 1, four compounded curable fluorocarbon elastomer gumstocks were prepared, each containing two different conventional curing agents, and, further containing, in Runs 39 and 41, a fluoroaliphatic sulfonamide curing agent suitable for use in this invention. Runs 38 and 40 were comparative runs. The identities and amounts of the various ingredients are shown in Table XII.

TABLE XII

| Curable gumstock ingredients | Run no. | | | |
|---|---|---|---|---|
|  | 38 | 39 | 40 | 41 |
| FKM C, parts | 100 | 100 | 100 | 100 |
| Carbon black (N-990), phr | 30 | 30 | 30 | 30 |
| MgO*a*, phr | 15 | 15 | 15 | 15 |
| DIAK No. 1*b*, mhr × 10³ | 8.70 | 8.70 | — | — |
| DIAK No. 3*c*, mhr × 10³ | — | — | 8.70 | 8.70 |
| C₈F₁₇SO₂N(CH₃)H, mhr × 10³ | — | 1.86 | — | 1.86 |

*a*MAGLITE Y, commercially available from Merck
*b*Hexamethylenediamine carbamate, ⁺H₃N(CH₂)₆NHCOO⁻
*c*N,N'-dicinnamylidine-1,6-hexanediamine, (CH₂)₆(N=CHCH=CHC₆H₅)₂

Curing characteristics and properties of cured gumstock are shown in Table XIII.

TABLE XIII

|  | Run no. | | | |
|---|---|---|---|---|
|  | 38 | 39 | 40 | 41 |
| Curing characteristics | | | | |
| ODR, 177° C.: | | | | |
| $M_L$, N · m | 1.92 | 1.81 | 0.90 | 1.13 |
| $M_H$, N · m; 12 minutes | 6.89 | 7.34 | 2.60 | 8.02 |
| $t_{sh}$, minutes | 2.5 | 2.4 | 5.0 | 4.0 |
| $t_{5.6}$, minutes | 7.0 | 6.4 | — | 7.8 |
| Properties of cured gumstock | | | | |
| Press cure properties (10 min/177° C.):*a* | | | | |
| Tensile strength, MPa | 13.82 | 12.62 | 10.40 | 9.38 |
| Elongation at break, % | 268 | 242 | 520 | 300 |
| Modulus, 100%, MPa | 3.58 | 3.58 | 2.01 | 3.10 |
| Hardness, Shore A | 68 | 68 | 65 | 69 |
| Postcure properties (16 hrs/260° C.): | | | | |
| Tensile strength, MPa | 13.20 | 11.34 | 9.98 | 10.31 |
| Elongation at break, % | 232 | 187 | 247 | 145 |
| Modulus, 100%, MPa | 4.06 | 4.54 | 3.18 | 6.40 |
| Hardness, Shore A | 71 | 73 | 74 | 83 |

*a*Run 40 was press cured for 20 min. at 177° C.

A faster cure rate and a more highly cross-linked cured elastomer, as indicated by a higher modulus (except press cured gumstock of Run 39) and a lower elongation at break, were obtained for elastomer gumstocks containing fluoroaliphatic sulfonamide curing agents.

EXAMPLE 7

A vinylidene fluoride copolymer gum (FKM C) and a vinylidene fluoride terpolymer gum (FKM T) were compounded in several different runs on a two-roll rubber mill with various conventional vulcanizing agents and adjuvants. FKM C contains 80 mole percent $CF_2=CH_2$ and 20 mole percent $CF_3CF=CF_2$. FKM T contains 60 mole percent $CF_2=CH_2$, 20 mole percent $CF_3CF=CF_2$, and 20 mole percent $CF_2=CF_2$. In two of the runs, a fluoroaliphatic sulfonamide curing agent suitable for use in this invention was incorporated into the formulation. The milled, compounded gumstocks were evaluated for curing characteristics, and properties of the cured gumstocks were measured after press cure, post cure, and aging. Compression set was also determined. The runs and results obtained are shown in Table XIV. Control runs, i.e., formulations without fluoroaliphatic sulfonamide curing agent, were also run for the purpose of comparison.

TABLE XIV

| Curable gumstock ingredients | Run no. | | | |
|---|---|---|---|---|
| | 42 | 43 | 44 | 45 |
| FKM C, parts | 100 | 100 | 0 | 0 |
| FKM T, parts | — | — | 100 | 100 |
| Carbon black (N-990), phr | 30 | 30 | 30 | 30 |
| MgO$^a$, phr | 3 | 3 | 3 | 3 |
| Ca(OH)$_2$, phr | 6 | 6 | 6 | 6 |
| TPBPC$^b$, mhr × 10$^3$ | 1.22 | 1.22 | 1.22 | 1.22 |
| Bisphenol AF$^c$, mhr × 10$^3$ | 6.49 | 6.49 | 6.49 | 6.49 |
| C$_8$F$_{17}$SO$_2$N(CH$_3$)Na, mhr × 10$^3$ | 0 | 1.27 | 0 | 1.27 |

$^a$MAGLITE D, commercially available from Merck
$^b$Cure accelerator No. 1 in Table II
$^c$Curing agent No. 1 in Table I Curing characteristics and properties of cured gumstock are shown in Table XV.

TABLE XV

| | Run no. | | | |
|---|---|---|---|---|
| | 42 | 43 | 44 | 45 |
| Curing characteristics | | | | |
| ODR, 177° C.: | | | | |
| M$_L$, N · m | 1.02 | 0.96 | 2.26 | 1.92 |
| M$_H$, N · m, 12 min. | 11.1 | 11.5 | 10.8 | 12.2 |
| t$_{sh}$ minutes | 5.3 | 4.0 | 4.1 | 5.1 |
| t$_{5,6}$, minutes | 7.3 | 5.9 | 6.7 | 7.6 |
| Properties of cured gumstock | | | | |
| Press cure properties (10 min/177° C.): | | | | |
| Tensile strength, MPa | 8.62 | 9.39 | 9.78 | 8.45 |
| Elongation at break, % | 255 | 232 | 306 | 265 |
| Modulus, 100% MPa | 4.12 | 4.29 | 4.42 | 4.06 |
| Hardness, Shore A | 74 | 75 | 76 | 79 |
| Postcure properties (20 hrs/260° C.): | | | | |
| Tensile strength, MPa | 14.70 | 13.48 | 15.42 | 14.91 |
| Elongation at break, % | 184 | 169 | 222 | 179 |
| Modulus, 100%, MPa | 6.45 | 6.37 | 5.90 | 6.89 |
| Hardness, Shore A | 76 | 77 | 80 | 82 |
| Aging properties (70 hrs/275° C.): | | | | |
| Tensile strength, MPa | 9.71 | 10.01 | 8.06 | 8.01 |
| Elongation at break, % | 193 | 183 | 338 | 254 |
| Modulus, 100%, MPa | 4.84 | 4.83 | 3.14 | 3.96 |
| Hardness, Shore A | 77 | 77 | 80 | 82 |
| Compression set (70 hrs/200° C.), % | 20 | 18 | 24 | 21.7 |

A higher torque (M$_H$) was observed after 12 minutes for gumstocks containing fluoroaliphatic sulfonamide curing agents (Runs 43 and 45). A lower compression set was also obtained for the elastomers of Runs 43 and 45.

COMPARATIVE EXAMPLE A

The purpose of this comparative example is to show the properties of the cured composition described in U.S. Pat. No. 3,632,788. Run 46 employed the composition used in Formulation D of the example of U.S. Pat. No. 3,632,788. The composition of Run 47 was identical to that of Run 46 with the exception that an organo-onium accelerator was employed. The composition of Run 48 was identical to that of Run 47 with the exception that the amine curing agent was omitted. The identities and amounts of the various ingredients are shown in Table XVI.

TABLE XVI

| | Run no. | | |
|---|---|---|---|
| Curable gumstock ingredients | 46 | 47 | 48 |
| FKM C, parts | 100 | 100 | 100 |
| Carbon black (N-990), phr | 15 | 15 | 15 |
| PbO, phr | 20 | 20 | 20 |
| DIAK No. 1$^a$, mhr × 10$^3$ | 6.25 | 6.25 | 0 |
| TPBPC$^b$, mhr × 10$^3$ | 0 | 1.28 | 1.28 |
| Fluoroether A, phr | 27 | 27 | 27 |
| C$_8$F$_{17}$SO$_2$N(C$_2$H$_5$)C$_2$H$_4$OPO(OH)$_2$, mhr × 10$^3$ | 30.72 | 30.72 | 30.72 |

$^a$Hexamethylenediamine carbamate, $^+$H$_3$N(CH$_2$)$_6$NHCOO$^-$
$^b$Cure accelerator No. 1 in Table II The compositions were mixed, press cured, oven cured, and aged under the conditions indicated in Table XVII. Curing characteristics and properties of cured gumstock are shown in Table XVII.

TABLE XVII

| | Run no. | | |
|---|---|---|---|
| | 46 | 47 | 48 |
| Curing characteristics | | | |
| ODR, 177° C.: | | | |
| M$_L$, N · m | 0.22 | 0.22 | 0.22 |
| M$_H$, N · m, 12 min. | 0.22 | 0.33 | 0.22 |
| t$_{sh}$, minutes | * | 12 | * |
| t$_{5,6}$, minutes | * | * | * |
| Properties of cured gumstock | | | |
| Press cure properties (10 min/177° C.): | | | |
| Tensile strength, MPa | 5.05 | 3.91 | ** |
| Elongation at break, % | 301 | 279 | ** |
| Modulus, 100% MPa | 0.96 | 0.92 | ** |
| Hardness, Shore A | 50 | 50 | ** |
| Postcure properties (20 hrs/260° C.): | | | |
| Tensile strength, MPa | 7.42 | 5.99 | ** |
| Elongation at break, % | 360 | 252 | ** |
| Modulus, 100%, MPa | 1.54 | 1.77 | ** |
| Hardness, Shore A | 58 | 58 | ** |
| Aging properties (70 hrs/275° C.): | | | |
| Compression set (70 hrs/200° C.), % | 95 | 88.5 | ** |

*The value of torque could not be measured because there was no change between maximum and minimum values.
**The gumstock did not cure.

The data in Table XVII show that a gumstock composition having a curing agent consisting of a diamine and a fluoroaliphatic sulfonamide only (Run 46) and a gumstock composition having a curing agent consisting of a diamine, a fluoroaliphatic sulfonamide, and an organo-onium accelerator (Run 47) result in a cured gumstock having a high value of compression set. A fluorocarbon elastomer gum having this high of a value of compression set would not be useful for preparing many shaped articles.

The data in Table XVII also show that a gumstock composition having a curing agent consisting of a fluoroaliphatic sulfonamide and an organo-onium accelerator only would not cure.

COMPARATIVE EXAMPLE B

The purpose of this comparative example is to show the properties of a cured composition similar to, but not identical to, that described in U.S. Pat. No. 3,632,788. In this example, the fluoroaliphatic sulfonamide $C_8F_{17}SO_2N(C_2H_5)H$ was used in place of the fluoroaliphatic sulfonamide $C_8F_{17}SO_2N(C_2H_5)C_2H_4OPO(OH)_2$. The composition of Run 49 was analogous to the composition used in Formulation D of the example of U.S. Pat. No. 3,632,788. The composition of Run 50 was identical to that of Run 49 with the exception that an organo-onium accelerator was employed. The composition of Run 51 was identical to that of Run 50 with the exception that the amine curing agent was omitted. The identities and amounts of the various ingredients are shown in Table XVIII.

TABLE XVIII

| Curable gumstock ingredients | Run no. | | |
|---|---|---|---|
| | 49 | 50 | 51 |
| FKM C, parts | 100 | 100 | 100 |
| Carbon black (N-990), phr | 15 | 15 | 15 |
| PbO, phr | 20 | 20 | 20 |
| DIAK No. 1$^a$, mhr × 10$^3$ | 6.25 | 6.25 | 0 |
| TPBPC$^b$, mhr × 10$^3$ | 0 | 1.28 | 1.28 |
| $C_8F_{17}SO_2N(C_2H_5)H$, mhr × 10$^3$ | 30.72 | 30.72 | 30.72 |
| Fluoroether A, phr | 27 | 27 | 27 |

$^a$Hexamethylenediamine carbamate. $^+H_3N(CH_2)_6NHCOO^-$
$^b$Cure accelerator No. 1 in Table II The compositions were mixed, press cured, oven cured, and aged under the conditions indicated in Table XIX. Curing characteristics and properties of cured gumstock are shown in Table XIX.

TABLE XIX

| | Run no. | | |
|---|---|---|---|
| | 49 | 50 | 51 |
| Curing characteristics | | | |
| ODR, 177° C.: | | | |
| $M_L$, N·m | 0.34 | 0.45 | 0.23 |
| $M_H$, N·m, 12 min. | 1.02 | 2.15 | 0.23 |
| $t_{s1}$, minutes | 3.4 | 1.6 | * |
| $t_{5.6}$, minutes | * | * | * |
| Properties of cured gumstock | | | |
| Press cure properties (10 min/177° C.): | | | |
| Tensile strength, MPa | 5.58 | 5.61 | ** |
| Elongation at break, % | 310 | 261 | ** |
| Modulus, 100% MPa | 1.03 | 1.23 | ** |
| Hardness, Shore A | 47 | 49 | ** |
| Postcure properties (20 hrs/260° C.): | | | |
| Tensile strength, MPa | 7.68 | 6.71 | ** |
| Elongation at break, % | 245 | 186 | ** |
| Modulus, 100%, MPa | 1.95 | 2.14 | ** |
| Hardness, Shore A | 55 | 49 | ** |
| Aging properties (70 hrs/275° C.): | | | |
| Compression set | 87 | 82 | ** |
| (70 hrs/200° C.), % | | | |

*The value of torque could not be measured because the difference between the maximum and minimum torque was too low.
**The gumstock did not cure.

The data in Table XVIII show that a gumstock composition having a curing agent consisting of a diamine and a fluoroaliphatic sulfonamide only (Run 49) and a gumstock composition having a curing agent consisting of a diamine, a fluoroaliphatic sulfonamide, and an organo-onium accelerator (Run 50) result in a cured gumstock having a high value of compression set. A fluorocarbon elastomer gum having this high of a value of compression set would not be useful for preparing many shaped articles.

The data in Table XVII also show that a gumstock composition having a curing agent consisting of a fluoroaliphatic sulfonamide and an organo-onium accelerator only would not cure.

EXAMPLE 8

The purpose of this example is to show that a curing agent consisting of a polyhydroxy compound, an organo-onium accelerator, and a fluoroaliphatic sulfonamide must be used to provide the benefits of the present invention. The gumstock composition of Runs 52 and 53 contained a curing agent consisting of a polyhydroxy compound, an organo-onium accelerator, and a fluoroaliphatic sulfonamide. The gumstock composition of Run 54 contained a curing agent consisting of polyhydroxy compound and an organo-onium accelerator, but no fluoroaliphatic sulfonamide. The gumstock composition of Run 55 contained a curing agent consisting of a polyhydroxy compound, but no organo-onium accelerator and no fluoroaliphatic sulfonamide. The gumstock composition of Run 56 contained a curing agent consisting of a polyhydroxy compound and a fluoroaliphatic sulfonamide, but no organo-onium accelerator. The gumstock composition of Run 57 contained a curing agent consisting of an organo-onium accelerator and a fluoroaliphatic sulfonamide, but no polyhydroxy compound. The identities and amounts of the various ingredients are shown in Table XX.

TABLE XX

| Curable gumstock ingredients | Run no. | | | | | |
|---|---|---|---|---|---|---|
| | 52 | 53 | 54 | 55 | 56 | 57 |
| FKM C, parts | 100 | 100 | 100 | 100 | 100 | 100 |
| Carbon black (N-990), phr | 30 | 30 | 30 | 30 | 30 | 30 |
| MgO$^a$, phr | 3 | 3 | 3 | 3 | 3 | 3 |
| Ca(OH)$_2$, phr | 6 | 6 | 6 | 6 | 6 | 6 |
| TPBPC$^b$, mhr × 10$^3$ | 1.21 | 1.21 | 1.21 | — | — | 1.21 |
| Bisphenol AF$^c$, mhr × 10$^3$ | 2.23 | 2.23 | 2.23 | 2.23 | 2.23 | — |
| $C_8F_{17}SO_2N(C_2H_5)H$, mhr × 10$^3$ | 1.21 | — | — | — | 1.21 | 1.21 |
| $C_8F_{17}SO_2(C_2H_5)C_2H_4OPO(OH)_2$, mhr × 10$^3$ | — | 1.21 | — | — | — | — |

$^a$MAGLITE D, commercially available from Merck
$^b$Cure accelerator No. 1 in Table II
$^c$Curing agent No. 1 in Table I The compositions were mixed, press cured, oven cured, and aged under the conditions indicated in Table XXI. Curing characteristics and properties of cured gumstock are shown in Table XXI.

TABLE XXI

| | Run no. | | | | | |
|---|---|---|---|---|---|---|
| | 52 | 53 | 54 | 55 | 56 | 57 |
| Curing characteristics | | | | | | |
| ODR, 177° C.: | | | | | | |
| $M_L$, N · m | 1.69 | 1.69 | 1.69 | 1.24 | 1.24 | 1.81 |
| $M_H$, N · m, 12 min. | 5.98 | 5.08 | 3.5 | 1.24 | 1.24 | 2.71 |
| $t_{sl}$, minutes | 1.1 | 1.0 | 1.5 | * | * | 1.8 |
| $t_{5.6}$, minutes | 3.8 | * | * | * | * | * |
| Properties of cured gumstock | | | | | | |
| Press cure properties (10 min/177° C.): | | | | | | |
| Tensile strength, MPa | 10.30 | 10.07 | 5.52 | ** | ** | *** |
| Elongation at break, % | 434 | 545 | 544 | ** | ** | *** |
| Modulus, 100% MPa | 2.5 | 2.06 | 2.03 | ** | ** | *** |
| Hardness, Shore A | 65 | 66 | 65 | ** | ** | *** |
| Postcure properties (20 hrs/260° C.): | | | | | | |
| Tensile strength, MPa | 12.40 | 10.93 | 6.75 | ** | ** | *** |
| Elongation at break, % | 286 | 375 | 467 | ** | ** | *** |
| Modulus, 100%, MPa | 2.77 | 2.38 | 2.26 | ** | ** | *** |
| Hardness, Shore A | 66 | 68 | 68 | ** | ** | *** |
| Aging properties (70 hrs/275° C.): | | | | | | |
| Compression set (70 hrs/200° C.), % | 35 | 42 | 70 | ** | ** | *** |

*The value of torque could not be measured because the difference between the maximum and minimum torque was too low.
**The gumstock did not cure.
***The gumstock did not cure sufficiently to form a molded product.

The data in Table XXI show that in gumstock compositions wherein the curing agents contained a polyhydroxy compound, an organo-onium accelerator, and a fluoroaliphatic sulfonamide (Runs 52 and 53), the value of compression set was sufficiently low to be acceptable for preparing shaped articles. The data in Table XXI show that in a gumstock composition wherein the curing agent contained a polyhydroxy compound and an organo-onium accelerator, but no fluoroaliphatic sulfonamide (Run 54), the value of compression set was not sufficiently low to be acceptable for preparing shaped articles. The data in Table XXI show that in a gumstock composition wherein the curing agent contained a polyhydroxy compound but neither an organo-onium accelerator nor a fluoroaliphatic sulfonamide (Run 55), the composition would not cure. The data in Table XXI show that in a gumstock composition wherein the curing agent contained a polyhydroxy compound and a fluoroaliphatic sulfonamide, but no organo-onium accelerator, the composition would not cure. The data in Table XXI show that in a gumstock composition wherein the curing agent contained an organo-onium accelerator and a fluoroaliphatic sulfonamide but no polyhydroxy compound, the composition would not cure sufficiently to form a molded product, thereby rendering the property of compression set unmeasureable.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Method of preparing a shaped article comprising the steps of:
   (a) providing a curable composition comprising at least one fluorocarbon elastomer gum, at least one polyhydroxy compound or derivative thereof as a curing agent therefor, at least one fluoroaliphatic sulfonamide as a curing agent for the fluorocarbon elastomer gum, an acid acceptor, and at least one organo-onium accelerator, the amount of said fluoroaliphatic sulfonamide curing agent being present in said composition in the range of about 0.0002 to about 0.006 mole per hundred grams of said gum, said fluoroaliphatic sulfonamide curing agent being represented by the general formula:

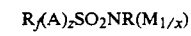

or

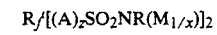

wherein
   $R_f$ represents a monovalent fluoroaliphatic radical having from 1 to 20 carbon atoms,
   $R_f'$ represents a divalent fluoroaliphatic radical having from 1 to 20 carbon atoms,
   A represents an organic linkage,
   Z represents zero or one,
   R represents hydrogen atom or alkyl radical having from 1 to 20 carbon atoms, and
   M represents hydrogen atom or salt forming cation with valence x, which is 1, 2, or 3, the amounts of said curing agents being sufficient to bring about cross-linking of said fluorocarbon elastomer gum,
   (b) heating said composition to a temperature sufficient to cure said composition, and
   (c) recovering said shaped article.

2. The method of claim 1, wherein A is selected from the group consisting of $-CR^1R^2-$, $-CR^1R^2CR^3R^4-$, and $-CR^1=CR^2-$, wherein $R^1$, $R^2$, $R^3$, and $R^4$ are selected from the group consisting of hydrogen atom, fluorine atom, chlorine atom, and lower alkyl group.

3. The method of claim 1, wherein $R_f$ represents a monovalent fluoroaliphatic radical having from 4 to 10 carbon atoms.

4. The method of claim 1, wherein $R_f'$ represents a divalent fluoroaliphatic radical having from 2 to 10 carbon atoms.

5. The method of claim 1, wherein said fluorocarbon elastomer gum is a copolymer of vinylidene fluoride and at least one fluorine-containing olefin, and, optionally, a fluorinated alkyl vinyl ether.

6. The method of claim 1, wherein said composition further includes a reinforcing agent.

7. The method of claim 1, wherein the total concentration of fluoroaliphatic sulfonamide curing agent and polyhydroxy curing agent in said composition is at least 0.001 mole per hundred grams of said gum.

8. Method of preparing a shaped article comprising the steps of:
 (a) providing a curable composition comprising:
  (1) at least one fluorocarbon elastomer gum,
  (2) at least one fluoroaliphatic sulfonamide as a curing agent therefor selected from the group consisting of $C_8F_{17}SO_2NR(M_{1/x})$, $C_8F_{17}C_2H_4SO_2N(R)(M_{1/x})$, $C_4F_9SO_2NR(M_{1/x})$, where R represents hydrogen atom or alkyl radical having from 1 to 20 carbon atoms, M represents hydrogen atom or salt forming cation with valence x, which is 1, 2, or 3, said sulfonamide being present in the composition in the range of about 0.0002 to about 0.006 mole per hundred grams of said gum,
  (3) at least one organo-onium accelerator, and
  (4) at least one polyhydroxy compound or derivative thereof as a curing agent for the fluorocarbon elastomer gum, the amount of said curing agents being sufficient to bring about cross-linking of the fluorocarbon elastomer gum;
 (b) heating said composition to a temperature sufficient to cure said composition; and
 (c) recovering said shaped article.

9. The method of claim 8, wherein the fluorocarbon elastomer gum is a polymer of vinylidene fluoride and hexafluoropropene.

10. The method of claim 8, wherein the fluorocarbon elastomer gum is a polymer of vinylidene fluoride, hexafluoropropene, and tetrafluoroethylene.

* * * * *